July 14, 1959    C. L. BROWN ET AL    2,894,332
COMBINATION CALIPER MICROMETER
Filed April 15, 1957    3 Sheets-Sheet 1
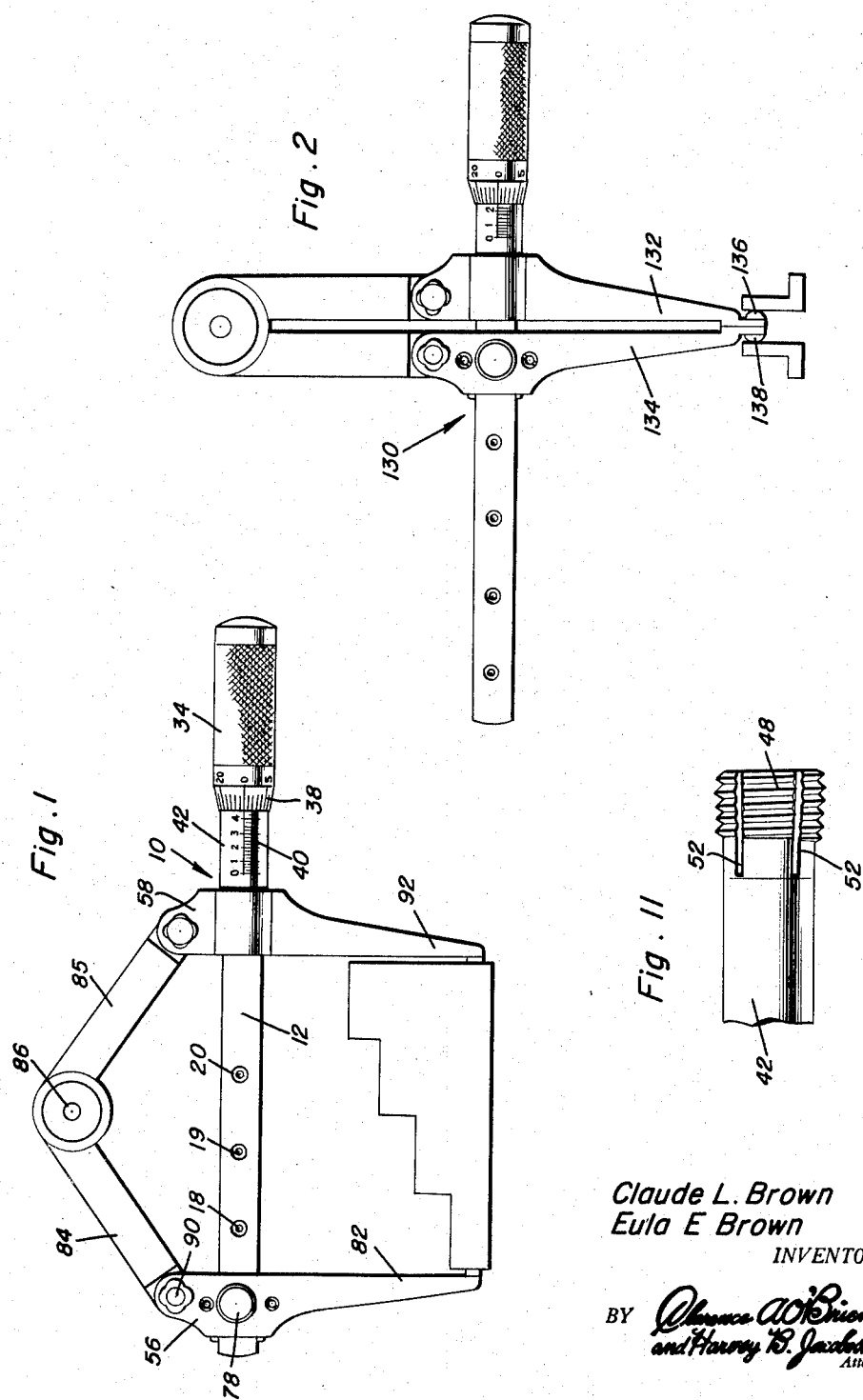
Claude L. Brown
Eula E. Brown
    INVENTORS.

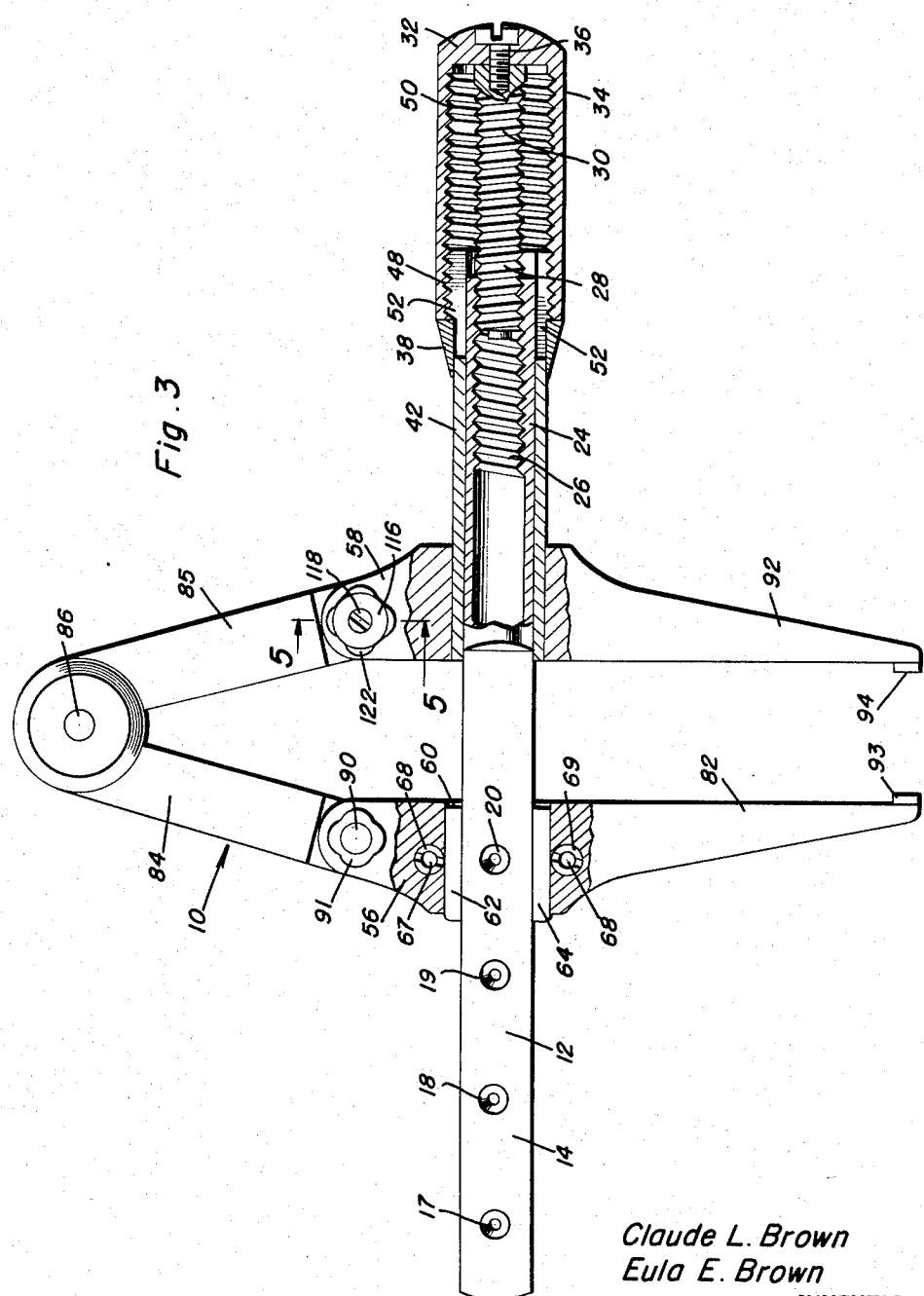

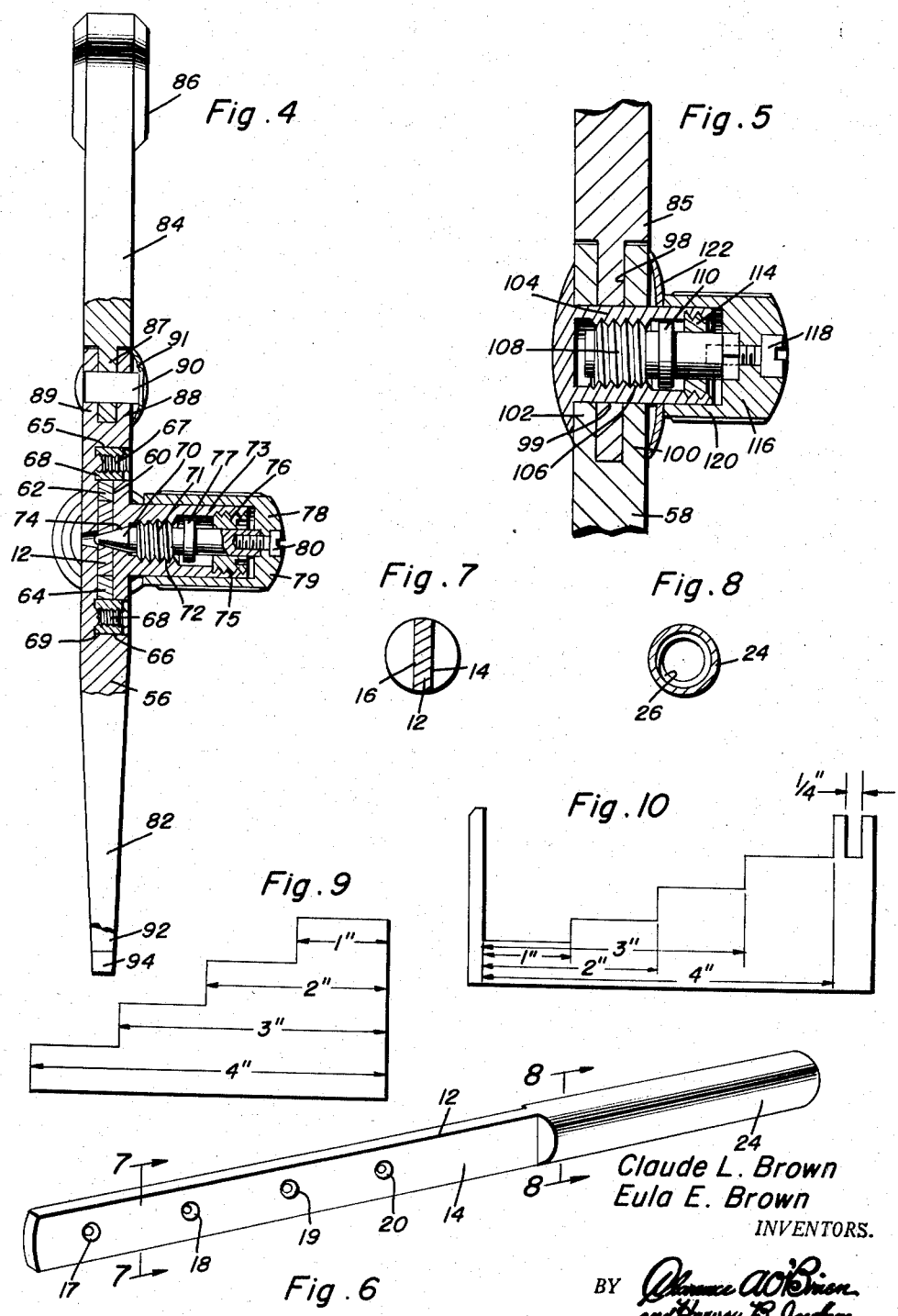

United States Patent Office 2,894,332
Patented July 14, 1959

2,894,332

COMBINATION CALIPER MICROMETER

Claude L. Brown and Eula E. Brown, Melbourne, Fla.

Application April 15, 1957, Serial No. 652,950

2 Claims. (Cl. 33—159)

This application is a continuation-in-part of our copending application Serial No. 610,854, filed September 19, 1956.

This invention relates to a micrometer caliper and more particularly to a caliper capable of inside and outside measurements to very fine tolerances.

An object of the invention is to provide a micrometer caliper which has a pair of legs movable with respect to each other on a single beam, the movement being caused by rotation of a micrometer thimble. A micrometer caliper constructed in accordance with the invention has both legs simultaneously movable by adjustment of the thimble of the micrometer caliper. Two arms are connected respectively to the beam and the micrometer sleeve. The micrometer screw is threaded in the bore of the beam and the thimble to which the screw is secured, is operatively connected with the nut on the micrometer sleeve. By virtue of this construction the micrometer sleeve is moved with respect to the beam and moved a precise distance that the beam moves with respect to the sleeve due to the pitch of the threads which interconnect the thimble to the sleeve and to the beam respectively. In the past calipers had no way to indicate the differential movement between their legs. Rather, the distances wherever referred to were other measuring devices for computing the dimensional measurements. In our micrometer caliper such distances are capable of accurate direct reading from the micrometer caliper.

Other objects and features of importance will become apparent in following the description of the illustrated forms of the invention.

In the drawing:

Figure 1 is an elevational view of a micrometer caliper constructed in accordance with our invention and showing the same used for an outside measurement;

Figure 2 is an elevational side view of the micrometer caliper in accordance with our invention, showing the same being used for an inside measurement;

Figure 3 is an elevational side view with parts shown in section, this view illustrating our micrometer caliper on an enlarged scale;

Figure 4 is an elevational end view of the caliper of Figure 3, parts being broken away in section to illustrate internal detail;

Figure 5 is a sectional view on an enlarged scale taken on the line 5—5 of Figure 3;

Figure 6 is a perspective view of the beam which constitutes a part of our micrometer caliper;

Figure 7 is a transverse sectional view taken on the line 7—7 of Figure 6;

Figure 8 is a transverse sectional view taken on the line 8—8 of Figure 6;

Figure 9 is a schematic representation showing positional adjustments for the arms of the caliper, this view also showing a test block to check the caliper;

Figure 10 is a side elevational view of another testing block to check the accuracy of the micrometer caliper; and Figure 11 is a fragmentary elevational view of the micrometer sleeve.

In the accompanying drawings there is a micrometer caliper 10 constructed in accordance with the principles of the invention. It consists of a beam 12 having flat parallel sides 14 and 16 in which four countersunk holes 17, 18, 19 and 20 are formed. Beam 12 has a tubular end 24 in which there are internal threads 26. The tubular end 24 of beam 12 has threads with which the threads 28 of screw 30 are engaged. Screw 30 is attached to the end 32 of thimble 34, for example by bolt 36. The micrometer thimble has a graduated tapered indicator collar 38 at its inner end which coacts with graduations 40 on the outer surface of micrometer sleeve 42. The thimble may be knurled or otherwise scored to enhance the friction between the fingers of the user and the thimble.

Sleeve 42 has a group of threads 48 formed at the outer end, these threads being engaged by the threads 50 inside the thimble 34. A number of longitudinal slots 52 are formed in the threaded part 48 of sleeve 42 thereby dividing the sleeve into a number of segments which are sprung outwardly slightly in order to bind slightly with the threads 50 in thimble 34.

The tubular part 24 of beam 12 is concentrically fitted in sleeve 42. Frames 56 and 58 are attached respectively onto the beam 12 and the sleeve 42. Frame 56 has a passage 60 extending through it and of a shape which is suitable to receive the rectangular part of beam 12 but with upper and lower clearance. Shims 62 and 64 are fitted in passageway 60 and bear against the upper and lower surfaces of beam 12. Holes 65 and 66 are formed in frame 56 and on opposite sides of shims 62 and 64. Studs 67 and 68 are located centrally within the holes and they accommodate nuts 68 and 69 which have tapered side walls. When the nuts are tightened on their studs 67 and 68, the taper of the side walls of the nuts causes the shims 62 and 64 to bear tightly against the opposite edges of beam 12. This binds the beam causing it to fit snugly in passage 60.

A tapered pin 70 has a threaded part 71 in threaded bore 72 of shell 73. The shell rises from a surface of frame 56 enabling the pointed end of pin 70 to pass through a hole 74 in frame 56 and be passed into a selected hole 17, 18, 19 or 20 which are preferably on one inch centers of beam 12. The outer end of the case 73 is threaded as at 75 and accommodates the hollow threaded plug 76 through the center of which pin 70 passes. Collar 77 on pin 70 coming to bear against the threaded part 72 of case 73 and the hollow plug 76 limit the extent of travel of the pin 70. Cap 78 has a skirt fitted around case 73 and it has an end wall 79 attached, as by bolt 80, to the pin 70. Therefore, upon rotation of the cap 78, the pin will be extended or retracted for engagement or separation from the holes 17, 18, 19 and 20 of beam 12. In this way the frame 56, and the leg 82 thereon, is held in a selected position on the beam of the micrometer caliper.

Two links 84 and 85 respectively are connected together by hinge 86. The outer end of link 84 has a tongue 87 formed on it to fit between the bifurcations 88 and 89 formed at the upper end of frame 56. Pivot pin 90 passes through aligned apertures in tongue 87 and the bifurcations and is held biased by means of spring washer 91 which is located on and connected to pin 90.

Frame 58 has leg 92 depending therefrom, the legs 82 and 92 being companion to each other and each is provided with its work contacting feeler or anvil 93 and 94 respectively. The outer end of link 85 has a tongue 98 protruding therefrom, and there is an aperture 99 in this tongue. Bifurcations 100 and 102 are formed at the upper end of frame 58, and tongue 98 is disposed between these bifurcations. A hollow stud 104 is passed through the aperture 99 in tongue 98 and matching apertures in the bifurcations 100 and 102. The hollow stud has a threaded part 106 in which threaded shank 108 is operable. Collar 110 on the shank 108 is movable between the threaded part 106 and a hollow collar 114 that is threaded in the outer open end of the hollow stud 104. A cap 116 has the shank 108 attached to it, as by bolt 118 and has a skirt 120 which fits on the outer surface of the hollow stud 104. As the cap 116 is rotated, threads 108 cause it to move toward or away from the frame 58 and apply a compressive force on the spring steel washer 122 or relieve the compressive force therefrom. This washer is concentrically arranged on the hollow stud 104 and bears against the bifurcation 100. This increases or decreases the tension at the pivotal connection between link 85 and frame 58.

The frame 58 is attached by suitable means to the sleeve 42, for example, the frame may be pinned, held in place by set screws, put on and held in place by shoulders, collars or the like.

In operation, to measure outside dimensions the micrometer caliper 10 of Figure 3 is first adjusted by a rough measurement by moving the frame 56 to the one inch, two inch, three inch or four inch positions. Then, the micrometer thimble is rotated and due to the pitch of the threads between the beam, sleeve 42 and thimble 34, the sleeve 42 and the beam 12 both move inwardly or outwardly in the same direction. Then, by conventional micrometer reading of the graduations on the thimble and sleeve, precise measurements may be taken and read directly from our instrument.

For inside measurements, the micrometer caliper 130 of Figure 2 will be used. This micrometer caliper differs from the micrometer caliper 10 only to the extent that the legs 132 and 134 thereof have a exteriorly mounted anvils 136 and 138. In all other respects the instruments are the same, it being intended that the two sets of legs shown in Figures 2 and 3 respectively, form, with the micrometer and beam, a single set.

The thread action in the invention is quite simple. As a typical example of threads which may be used, it is assumed that both threads are right hand with the threads in the thimble numbering 40 to the inch and the threads on screw 28 numbering 20 to the inch. Upon rotating the thimble 40 turns in a counterclockwise direction or vice versa, the 20 threads will move the beam and the attached leg outward and away from the micrometer thimble 2 inches. With the concomitant result in the other leg being movement in the same direction of only 1 inch. Therefore the distance between the legs will be 1 inch as recorded on the micrometer sleeve and thimble. In other words, by having the 40 and 20 screw threads per inch relationship, sleeve 42 and beam 12 both move inward or outward in the same direction with the beam 12 moving twice as far as the sleeve 42.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A micrometer caliper comprising a beam having a tubular end provided with internal threads, a sleeve reciprocably mounted on said tubular end and having external threads, a micrometer thimble, said thimble and said sleeve having cooperating graduations from which direct micrometer readings may be made, said thimble being internally threaded to fit on the external threads of said sleeve, a screw carried by said thimble and concentrically arranged therewith and threaded within said internal threads of said tubular end of said beam, a first frame having a caliper leg, means securing said first frame to said beam, a second frame having a caliper leg, said second frame being secured to said sleeve, an equalizing linkage pivotally connected to each of said frames, said means connecting said first frame to said beam including a rectangular passageway in said first frame, said beam having a flat rectangular cross-section of a size to fit within said passageway, shims in said passageway and bearing against edges of said beam, and means carried by said first frame and contacting said shims to exert a force thereon to press said shims against said beam, said beam having a plurality of holes that are spaced from each other, means carried by said first frame and engageable in a selected hole in said beam to locate said leg on said first frame in a predetermined spaced relationship to the leg on said second frame.

2. A micrometer caliper comprising a thimble, a sleeve fitted within said thimble, said thimble and sleeve having engaging threaded surfaces having a first pitch, a beam, said beam having a hollow internally threaded end having a second pitch, a screw carried by said thimble and engageable within said hollow threaded end of said beam, said first and second pitches being of the same direction but of differing magnitudes so that upon rotation of said thimble, said sleeve and said beam are each moved in the same direction but are moved different distances, a first caliper leg, a second caliper leg, means attaching said first caliper leg to said beam, and means attaching said second caliper leg to said sleeve, a pair of links, a hinge connecting adjacent ends of said links together, the outer ends of said links being pivoted respectively to said means connecting said first caliper leg to said beam and said means connecting said second caliper leg to said sleeve, said caliper leg connecting means each being separably connected so that said legs may be removed and replaced by other caliper legs for the purpose of providing for inside and outside measurements respectively.

References Cited in the file of this patent

UNITED STATES PATENTS

| 1,763,941 | Witchger | June 17, 1930 |
| 2,469,926 | Layton | May 10, 1949 |
| 2,634,505 | Petch | Apr. 14, 1953 |

FOREIGN PATENTS

| 357 | Great Britain | Jan. 27, 1880 |
| 521,794 | France | Mar. 15, 1921 |